Figure 1:
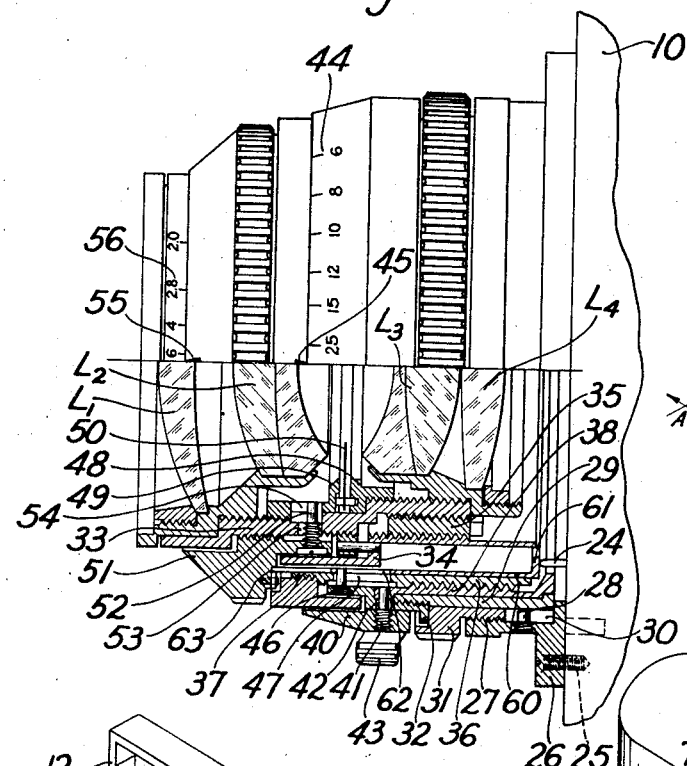

Jan. 9, 1940.　　　　J. MIHALYI　　　　2,186,616

PHOTOGRAPHIC APPARATUS

Filed July 14, 1938

Joseph Mihalyi
INVENTOR

BY

ATTORNEYS

Patented Jan. 9, 1940

2,186,616

UNITED STATES PATENT OFFICE 2,186,616

PHOTOGRAPHIC APPARATUS

Joseph Mihalyi, Rochester, N. Y., assignor to Eastman Kodak Company, Rochester, N. Y., a corporation of New Jersey Application July 14, 1938, Serial No. 219,178

9 Claims. (Cl. 95—10)

The present invention relates to a photographic camera including a light sensitive device for ascertaining the time of exposure, and particularly to such a camera wherein the light sensitive device is automatically adjusted in accordance with the adjustment of the diaphragm carried by an interchangeable lens mount when the lens mount is positioned on the camera.

One object of the present invention is to provide a camera with a light sensitive device for automatically ascertaining the time of exposure in accordance with the adjustment of the diaphragm carried by an interchangeable lens mount adapted to be positioned on the camera.

And another object is to have the adjustment of the light sensitive device affected by an adjusting sleeve carried by the mount and arranged to be moved by the diaphragm operating ring; and adapted to operatively engage the adjusting means for the light sensitive device when the lens is positioned on the camera.

Another object of the invention is to so form or so connect the adjusting sleeve to the lens mount that the adjustment of the light sensitive means thereby will be in accordance with the change in the relative aperture of the diaphragm.

And yet another object is to arrange the adjusting means of the light sensitive cell adjacent the lens mount socket in the camera so as to be operatively engaged by one end of the adjusting sleeve when the mount is positioned on the camera.

Another object is to so arrange the adjusting sleeve on the lens mount that adjustment of the light sensitive device thereby is effected by movement axially of the lens mount, either by an axial cam on one end of the adjusting sleeve, or by a pin and spiral slot connection between the mount and the adjusting sleeve, the adjusting sleeve being rotated with the diaphragm operating ring in either case.

And yet another object is to provide a camera of the type described wherein the adjustment of the light sensitive means may be electrical or mechanical.

And a further object is to mount the adjusting sleeve and the lens mount in such a way that it becomes a part of the lens mount, and is positioned within the mount so as to be invisible and free from damaging blows which might be encountered in handling the mount.

In accordance with the present invention the connection between the light sensitive cell in the camera and the diaphragm operating ring carried by an interchangeable lens mount for altering the output of the former in accordance with the adjustment of the latter takes the form of a floating adjusting sleeve which forms a part of the lens mount. This adjusting sleeve is connected to the diaphragm operating ring to be moved thereby and is adapted to operatively engage an adjusting means for the light sensitive device in the camera when the lens mount is positioned on the camera, whereby the light sensitive device is adjusted in accordance with the change in the relative aperture of the diaphragm.

Figure 4:
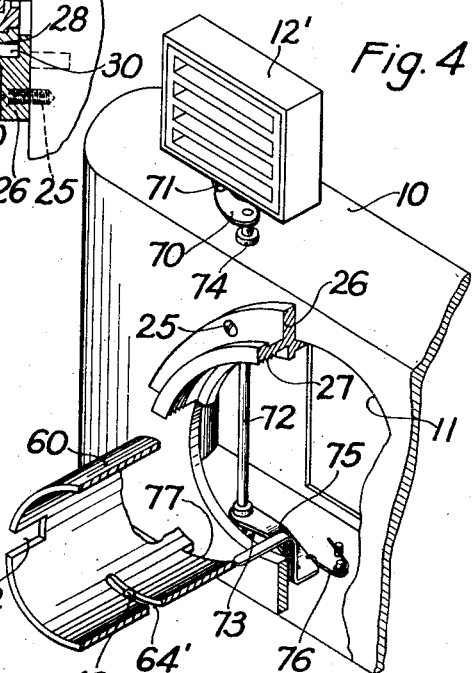

The novel features that I consider characteristic of my invention are set forth with particularity in the appended claims. The invention itself, however, both as to its organization, together with additional objects and advantages thereof, will best be understood from the following description of specific embodiments when read in connection with the accompanying drawing in which, Fig. 1 is a side view, partly in section and partly in elevation, of an interchangeable lens mount according to the present invention, and taken substantially on line A—A of Fig. 2, Fig. 2 is a detail exploded perspective showing the manner in which the adjusting sleeve carried by the mount and for adjusting the light sensitive device in the camera is operatively connected to the diaphragm operating ring, Fig. 3 is an exploded perspective of the preferred embodiment of the invention, and showing how the adjusting sleeve, which is capable of axial movement relative to the mount, engages the adjusting means for the light sensitive device in the camera when the lens mount is positioned on the camera; the output of the light sensitive device in this instance being adjusted electrically, Fig. 4 is a view similar to Fig. 3 but showing another embodiment of the invention wherein the adjusting sleeve is capable of only rotation relative to the mount, an axial cam on the end thereof engaging means for mechanically adjusting the output of the light sensitive device in the camera.

Like reference characters refer to corresponding parts through the drawing.

It is pointed out that the present invention is directed to an arrangement for adjusting a light sensitive device carried by a camera through the adjustment of the diaphragm operating ring on an interchangeable lens mount so that the electrical output of said light sensitive device is varied in accordance with the change in the relative aperture of the diaphrgm, whereby the output of said light sensitive device serves to indicate the proper shutter speed setting to conform to the different diaphragm openings. While I have shown an arrangement whereby the output of the light sensitive device is altered electrically, by changing the variable resistance in the circuit of the device, or mechanically, by varying the intensity of light falling on the device, it is to be understood that the invention is not limited to either one of these means of adjusting the output of the light sensitive device. Further, so far as the present invention is concerned it is immaterial as to how the change in output of the light sensitive device operates to effect the shutter speed setting. The change in output of the device might serve to move the pointer of a meter from a given mark on the scale of the meter to which mark the pointer is returned when the shutter is set at a proper speed corresponding to the diaphragm opening, as is well known; or the change in output may serve to automatically set the shutter speed of a focal plane shutter in the manner disclosed in my copending application Serial No. 173,002, filed November 5, 1937.

Figure 2:
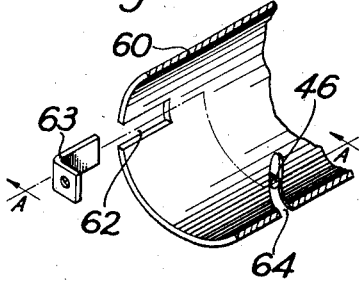
Figure 3:
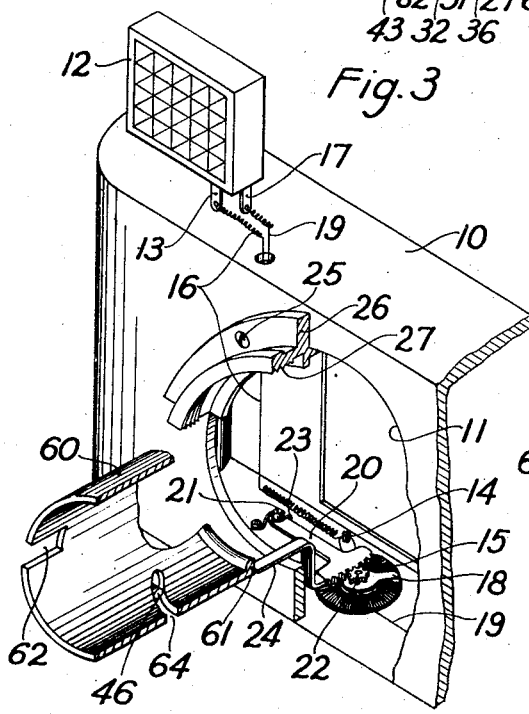

Referring now to Figs. 1, 2, and 3, wherein a preferred embodiment of the invention is shown, the camera casing 10 provided with a lens opening 11 includes a photoelectric cell 12 of a well-known type which may be mounted on the camera casing in such a manner that the face thereof is directed toward the front of the camera casing. One terminal 13 of the photoelectric cell is connected by a conductor 16 to a fixed contact 14 of the circular resistance 15 fixed in the bottom of the camera casing, while the other terminal 17 of the cell is connected by a conductor 19 to the movable contact 18 rotatably mounted in the camera casing to vary the resistance in the circuit of the cell to vary the output thereof. The conductor 19 of the circuit may include the usual measuring instrument, not shown, the position of the pointer of which will indicate the output of the photoelectric cell. The movable contact 18 is adapted to be moved by a gear segment 20 pivoted on a post 21 in the camera casing and in engagement with the pinion 22 fixed to the contact. A coiled spring 23 one end of which is fixed to the camera casing 10 while the other end is fixed to the gear segment, normally tends to rotate the gear segment in a direction to rotate the movable contact 18 counterclockwise to cut out all resistance in the photoelectric circuit. The gear segment 20 is adapted to be moved when pressure is applied to the end of the adjusting lever 24, which lever is fixed to the gear segment and is formed so as to extend axially through the lens opening 11 in the camera casing by a slight amount, for the purpose hereinafter described.

On the front of the camera casing 10 is fixed by any suitable means, such as screws 25, an adapter ring 26 which is seated, as shown, in the lens opening 11. The forward end of this adapter ring is internally threaded, as shown at 27, to receive an interchangeable lens mount of the type hereinafter described, and behind the threaded portion of the ring a locating stud 28 is screwed in to the ring to project radially into the same.

Referring now particularly to Fig. 1, the interchangeable lens mount comprises a stationary ring 29 the rear end of which is provided with a flange having a longitudinal locating slot 30 therein which is adapted to engage the locating stud 28 when the mount is positioned on the camera to insure the mount being arranged with the focusing and diaphragm scales on the top side thereof. Rotatably mounted on the stationary ring 29 is a locking ring 31 which is threaded to engage the threaded end of the adapter ring 26 to hold the lens mount on the camera casing 10. This locking ring 31 is held against axial movement relative to the mount as a whole by the flange in the rear end of the stationary ring and by the offset flanged ring 32 which is threaded onto the front end of the stationary ring.

The optical elements L1, L2, L3, and L4, making up an objective of a given focal length, are each mounted in seats which are screwed into a lens barrel 33 so that the elements can be properly located relative to one another as a factory adjustment. This lens barrel is adjustably connected to the offset carrying sleeve 34 through the intermediate threaded member 35 so that this carrying sleeve supports the entire lens system to move the same for focusing purposes. To translate an axial movement to this carrying sleeve for the purpose of focusing the sleeve is connected to the focusing sleeve 36 by having a threaded end on the latter engaging a threaded recess in the forward offset portion of the carrying sleeve, as shown at 37. This focusing sleeve 36 is in threaded engagement with the focusing ring 38 which in turn is rotatably mounted in the stationary ring 29 and is held against axial movement relative to said ring due to the engagement of radial flanged portions on said ring engaging shoulders on the stationary ring, as is clearly shown in Fig. 1. The focusing ring 38 is rotated by turning the scale ring 40 which is rotatably mounted on the exterior of the offset flanged ring 32, said scale ring being connected to the focusing ring by the stud 41 fixed thereto and extending radially into the focusing ring through a circular peripheral slot 42 in the offset flanged ring 32. To facilitate the focusing adjustment, the scale ring 40 may be provided with an integral finger-piece 43, and the focusing adjustment is indicated by the scale 44 on the periphery of the scale ring in relation to an index 45 on the periphery of the carrying sleeve 34.

From the above description it will be readily understood that when the focusing ring 38 is rotated by turning the scale ring 40, the focusing sleeve 10 and along with it the carrying sleeve 34 and the entire lens assembly will be moved axially of the mount for focusing purposes, due to the fact that the focusing ring itself is held against axial movement. To limit the movement of the focusing sleeve 36 to a straight axial movement, a stud 46 is fixed to the offset flanged ring 32 and extends through a longitudinal slot 47 in the focusing sleeve to prevent rotation of the focusing sleeve and its associated lens assembly. This longitudinal slot 47 is of sufficient length to permit the focusing sleeve and its associated lens assembly to move axially of the stationary portion of the mount a sufficient distance to cover the focusing range of the objective.

The diaphragm for the lens mount may be of the usual type including a stationary ring 48 and a rotatable ring 49 between which the diaphragm blades 50 are connected by having one end of each blade fixed to the stationary ring and the other end thereof including a fixed pin engaging a radial slot in the movable ring. Inasmuch as this type of adjustable diaphragm is well known, and forms no part of the present invention, no further description of the same is deemed necessary. Adjustment of the diaphragm is accomplished by rotating the diaphragm operating ring 51 which is connected to the rotatable ring 49 of the diaphragm by the radially extending stud 52 which is fixed to the operating ring, extends through a peripheral slot 53 in the lens barrel 33, and into a longitudinal slot in the rotatable ring 49. The diaphragm adjustment is indicated by the position of the index 55 on the diaphragm operating ring relative to the scale 56 on the periphery of the lens barrel 33.

To connect the diaphragm operating ring 51 on the lens mount with the adjusting means of the photoelectric cell in the camera when the mount is positioned on the camera whereby the output of the photoelectric cell is varied in accordance with the change in relative aperture of the diaphragm the following structure is provided. A floating adjusting sleeve 60 is mounted within the focusing sleeve 36 so as to be capable of rotation and longitudinal movement relative to said focusing sleeve. In the preferred embodiment, as shown in Figs. 1, 2, and 3, this sleeve extends the length of the lens barrel so that its rear end which includes a circular radial flange 61 engages the adjusting lever 24 for altering the output of the photoelectric cell when the mount is positioned on the camera, and the forward end thereof lies adjacent the diaphragm operating ring 51. The forward end of the adjusting sleeve 60 is provided with a longitudinal slot 62 into which a key 63 fixed to the diaphragm operating ring extends to operatively connect the two so that rotation of the diaphragm operating ring will cause a rotation of the adjusting sleeve 60. The slot 62 in the adjusting sleeve 60 is sufficiently long to permit of the key 63 moving into the same during one extreme of the focusing movement without engaging and causing an axial movement of the sleeve, and the key is of such a length that it can move to the other extreme of the focusing movement without becoming disengaged from the slot. From this it follows that an adjustment of the diaphragm operating ring 51, regardless of the focusing position of the lens assembly, will effect a rotation of the adjusting sleeve.

Rotation of the adjusting sleeve 60 by the diaphragm operating ring 51 is translated to an axial movement of said sleeve due to a spiral slot 64 in the adjusting sleeve which engages the stud 46 fixed to the offset flanged ring 32 extending through the longitudinal slot 47 in the focusing sleeve 36. The lead of the spiral slot is calculated so as to give the proper axial movement to the adjusting sleeve for given increments of rotation thereof so that when the diaphragm operating ring is rotated to adjust the diaphragm, a corresponding rotation will be transmitted to the adjusting sleeve which in turn causes an axial movement of the sleeve to press against the adjusting lever 24 of the photoelectric cell adjusting mechanism whereby the output of the cell will be varied in accordance with the change in relative aperture of the diaphragm.

Axial movement of the adjusting sleeve 60 serves to move the adjusting lever 24 against the action of the coil spring 23 to vary the amount of resistance in the circuit of the photoelectric cell 12 and hence alter the output of the same. So that the output of the photoelectric cell will be varied in accordance with the change in the relative aperture of the objective as the diaphragm operating ring is moved, the lead of the spiral slot is so calculated that the necessary axial movement is translated thereto for given increments of rotation induced by rotation of the diaphragm ring between different settings. As will be readily understood by those skilled in the art, the axial adjustment of the adjusting sleeve 60 will have to be identical for the same relative aperture setting of the diaphragm of lens mounts having lenses of different focal length.

For instance, if in a lens mount having a 2 inch focal objective, when the diaphragm is set at f. 16 the adjusting sleeve moves axially a sufficient distance to alter the output of the photoelectric cell to indicate $\frac{1}{25}$ second exposure as being correct, another lens mount, having a 4 inch focal length objective set at f. 16 would have to give the same axial movement to the adjusting sleeve so that the same speed of exposure would be indicated. In either case the f. 16 setting of the diaphragm indicates that the diaphragm of the two lens mounts are open to give the same light intensity, but in the two cases the diameter of the diaphragm opening is changed according to the formula D equals f/16, where D is the diameter of the diaphragm opening, f is the focal length of the lens, and 16 is representative of a relative aperture setting. If the diaphragms of the different lens mounts are constructed so that the relative aperture markings are equally spaced on all mounts, e. g. f. 11 to f. 5.6 is always from the top of the mount to 25 degrees clockwise from the top, as is usually the case, the lead of the spiral slot 64 can be the same for all lens mounts.

It is pointed out that the section shown in Fig. 1 is not taken on a single plane, but is taken substantially on line A—A of Fig. 2. Such a section is taken to clearly show all of the essential parts of the mount clearly in their assembled position, such as Fig. 1, but it should be understood that the longitudinal slot 62 and the spiral slot 64 in the adjusting sleeve 60 are angularly displaced relative to one another so that axial movement of the key 63 relative to the sleeve 60 is not hampered by the stud 46 as might be inferred by Fig. 1 if it were assumed that this section was taken in a single plane.

The operation of the invention is as follows. When the camera casing is without a lens mount the adjusting lever is moved longitudinally through the lens opening by the coil spring to the position, shown in Fig. 3 and in this position of the adjusting lever there is no resistance in the circuit of the photoelectric cell. Now when a lens mount is fastened to the camera casing by having the locking ring 31 thereof screwed into the adapter ring 26, the rear end of the adjusting sleeve 60 will engage the adjusting lever 24 to move the same rearwardly to cut enough resistance into the photoelectric cell circuit to correspond with the setting of the diaphragm operating ring at the time the lens mount is positioned on the camera. If a diaphragm setting of f. 8 is desired, the diaphragm ring is rotated to give this setting and rotation of the diaphragm operating ring causes a rotation of the adjusting sleeve 60 through the engagement of the key 63 and the longitudinal slot 62 in the adjusting sleeve. This rotation of the adjusting sleeve will be transmitted into an axial movement of the same by virtue of the spiral slot 64 and stud 46 engagement, and the adjusting lever 24 will be moved the proper distance axially of the lens opening to cut in or remove sufficient resistance from the photoelectric cell circuit, whereby the output of the cell will indicate the correct shutter speed for the given diaphragm setting. The variation in the output of the photoelectric cell may automatically set the shutter speed or merely indicate the correct shutter speed as is well known in the art, and as described hereinbefore; but since the manner in which the output of the cell serves to indicate the correct shutter speed forms no part of the present invention no particular structure has been shown for accomplishing this step.

Referring now to Fig. 4, I have shown another embodiment of the invention wherein the variation of the output of the photoelectric cell is accomplished mechanically instead of electrically. In this embodiment the adjusting sleeve 60 rotatably mounted in the lens mount is provided with an axial cam on one end for transmitting a longitudinal movement to one member of the photoelectric cell adjusting means. In this embodiment of the invention the photoelectric cell 12' mounted on the camera casing 10 is of a well-known type which may be provided with an adjustable baffle means adapted to be operated when a lever is moved over a cam faced member connected to said baffle means for altering the output of the cell by varying the intensity of the light falling thereon. Such a photoelectric cell structure is shown in my copending application Serial No. 176,826, filed November 27, 1937, to which reference can be had for the specific construction and operation of the same. Inasmuch as this particular photoelectric cell structure is fully shown in the above-noted copending application and forms no part of the present invention per se, for the purpose of disclosing the present embodiment of the invention it will suffice to say that the baffle of the cell is normally spring pressed open and is gradually closed when the arm 70 is moved across the cam face of the member 71 attached to the baffle member. The arm 70 is fixed to one end of a rod 72 extending from the interior of the camera casing 10 to the exterior thereof adjacent the photoelectric cell 12', and said rod is rotatably mounted at its lower end in a bearing 73 fixed to the inside of the lower wall of the camera casing and intermediate its end in a bushing 74 in the top wall of the camera casing. Fixed to the rotatable rod is an offset adjusting lever 75 the end of which extends through the lens opening 11 in the camera casing. It will be readily understood that a movement of the adjusting lever 75 axially of the lens opening and rearwardly of the camera casing will cause a rotation of the rod 72 in a counter-clockwise direction whereby the arm 70 will be moved across the cam faced member 71 to gradually close the baffles thereby cutting down the amount of light falling on the cell to vary the output of said cell. The adjusting lever 75 is normally held in its forward position by the spring 76 in the camera casing in which position the baffle of the cell is wide open.

In this embodiment of the invention the lens mount and all its parts are the same as disclosed in connection with the preferred embodiment of the invention with the exception of the manner of transmitting movement to the adjusting lever 75 by the adjusting sleeve 60 as will be described hereinafter. As this arrangement is shown in Fig. 4 the adjusting sleeve 60 is rotatably mounted in the lens mount and connected to the diaphragm operating ring 51 as described above, but instead of having a spiral slot in the adjusting sleeve to transmit axial movement thereto, the sleeve is provided with a circular slot 64' which engages the stud 46 of the lens mount. By this arrangement rotation of the adjusting sleeve along with the diaphragm operating ring is permitted, but no axial movement of the adjusting sleeve can take place. The rear end of the adjusting sleeve 60 is provided with an axial cam surface 77 which is adapted to operatively engage the end of the adjusting lever 75 when the lens mount is positioned on the camera casing 10. Thus it will be seen that as the adjusting sleeve 60 is rotated along with diaphragm operating ring 51, when the latter is set at different relative aperture settings the cam surface 77 will effect a movement of the adjusting lever 75 rearwardly against the action of the spring 76 to adjust the light baffle of the photoelectric cell 12' for altering the output of said cell. It is needless to say that the form of the cam surface 77 in this embodiment is based on the same factors as the lead of the spiral slot 64 shown in the preferred embodiment, whereby the baffle is properly adjusted through movement of the adjusting sleeve 60 so that the output of the photoelectric cell is varied in accordance with the change in the relative aperture of the diaphragm.

Although I have shown and described certain specific embodiments of my invention, I am fully aware that many modifications thereof are possible. My invention, therefore, is not to be restricted except insofar as is necessitated by the prior art and by the spirit of the appended claims.

Having thus described my invention, what I declare is new and desire to secure by Letters Patent of the United States is:

1. The combination with a photographic camera having a lens opening in one wall thereof for receiving interchangeable lens mounts, and including a light sensitive device, and means for altering the output of said device, said means including a part adjacent said lens opening and adapted to be moved longitudinally thereof in adjusting said light sensitive device, of an interchangeable lens mount adapted to be positioned on said camera and in said lens opening, and comprising an adjustable diaphragm, means for operating said diaphragm, and an adjusting member operated by said diaphragm operating means and arranged to operatively engage said part in the camera when the lens mount is positioned in said opening and adapted for moving said part longitudinally of said opening when moved by said diaphragm operating means, whereby the output of said light sensitive device is altered in accordance with the change in diaphragm opening caused by an adjustment of said diaphragm.

2. The combination with a photographic camera including a light sensitive cell, and means for altering the output of said cell, of an exchangeable lens mount adapted to be positioned on said camera, and comprising an adjustable diaphragm, a diaphragm operating ring, and a rotatable adjusting sleeve operatively connected to said diaphragm operating ring to be rotated thereby, said adjusting sleeve including a cam surface adapted to engage said means in the camera for altering the output of the light sensitive cell when the mount is positioned on the camera, whereby the output of said cell is altered in accordance with the change in diaphragm opening when said diaphragm operating ring is moved.

3. The combination with a photographic camera including a light sensitive cell, and means for altering the output of said cell, of an exchangeable lens mount adapted to be positioned on said camera, and comprising an adjustable diaphragm, a rotatable diaphragm operating ring, and means for varying the output of said light sensitive cell in accordance with the change in the relative aperture of the diaphragm, said means including an adjusting sleeve rotatably mounted on the lens mount, one end of said adjusting sleeve adapted to operatively engage the means in said camera for varying the output of said cell, a connection between said adjusting sleeve and the mount for causing an axial movement of the sleeve upon rotation thereof, and means operatively connecting said sleeve and said diaphragm operating ring whereby rotation of one causes a rotation of the other.

4. The combination with a photographic camera having a lens opening and including a light sensitive cell, and means for varying the output of said cell, said means including an adjusting lever adjacent said lens opening and arranged to be moved axially thereof, of an exchangeable lens mount adapted to be positioned on said camera in said opening, and comprising an adjustable diaphragm, a rotatable diaphragm operating ring, a rotatable adjusting sleeve extending longitudinally of said mount whereby one end thereof is adapted to engage said adjusting lever in the camera when the mount is positioned on the camera, a pin and spiral slot connection between the sleeve and the mount whereby a rotative movement of the sleeve is translated to an axial movement thereof to move said adjusting lever for altering the output of said cell in accordance with the change in the relative aperture of the diaphragm, and means connecting said diaphragm operating ring and said adjusting sleeve whereby rotation of the former causes rotation of the latter.

5. An interchangeable lens mount adapted to be positioned on a camera having a lens socket and including a light sensitive cell, and means for altering the output of said cell in accordance with a variation of the lens opening of the mount including a part adjacent said lens socket to be moved longitudinally thereof in adjusting said light sensitive cell, said lens mount comprising means for detachably securing the mount to the camera, an adjustable diaphragm, a rotatable diaphragm adjusting ring, and an adjusting sleeve movable relative to said diaphragm adjusting ring and operatively connected thereto to be moved by an adjustment thereof, said sleeve arranged to operatively engage said part in the camera when the lens mount is positioned on said camera and to move the same longitudinally of said lens socket when moved by an adjustment of said diaphragm adjusting ring, whereby the output of said cell is altered in accordance with the change in diaphragm opening.

6. An interchangeable lens mount adapted to be positioned on a camera having a lens socket and including a light sensitive cell, and means for altering the output of said cell in accordance with a variation of the lens opening of the mount and including an arm adjacent said lens socket adapted to be moved longitudinally of said socket in adjusting said light sensitive cell, said lens mount comprising an adapter ring for detachably securing the mount to the camera, an adjustable diaphragm, means for adjusting said diaphragm, and an adjusting sleeve movable relative to said diaphragm adjusting means and operatively connected thereto, said sleeve arranged to operatively engage said arm in the camera for altering the output of the cell when said mount is positioned on the camera to move said arm longitudinally of said socket when moved by said diaphragm adjusting means, whereby the output of the cell is varied in accordance with the change in the diaphragm opening.

7. An interchangeable lens mount adapted to be positioned on a camera including a light sensitive cell, and means for altering the output of said cell in accordance with a variation of the lens opening of the mount, said lens mount comprising an adapter ring for detachably securing the mount to the camera, an adjustable diaphragm, a manually rotatable diaphragm operating ring, an adjusting sleeve extending longitudinally of said mount and being rotatable with respect thereto, said sleeve operatively connected to said diaphragm adjusting means to be moved by the adjustment thereof, and including a cam portion adapted to engage said means in the camera for altering the output of the light sensitive cell when the mount is positioned on the camera, whereby the output of said cell is varied in accordance with the change in diaphragm opening.

8. An interchangeable lens mount adapted to be positioned on a camera including a light sensitive cell, and means for altering the output of said cell in accordance with a variation of the lens opening of the mount, said lens mount comprising an adapter ring for detachably securing the mount to the camera, an adjusting sleeve rotatably mounted on and extending longitudinally of the lens mount, and arranged whereby one end thereof is adapted to operatively engage the means in the camera for altering the output of the light sensitive cell when said mount is attached to the camera, connecting means between said sleeve and the mount whereby rotation of the sleeve causes axial movement thereof relative to the mount, an adjustable diaphragm, and a manually rotatable diaphragm operating ring, said operating ring operatively connected to said connecting means, whereby rotation of the operating ring rotates the adjusting sleeve which in turn is moved axially of the mount to alter the output of the light sensitive cell in accordance with the change in the diaphragm opening.

9. An interchangeable lens mount adapted to be positioned on a camera including a light sensitive cell, and means for altering the output of said cell in accordance with a variation of the lens opening of the mount, said lens mount comprising means for detachably securing the mount to the camera, an adjustable diaphragm, a rotatable diaphragm operating ring, a rotatable adjusting sleeve extending longitudinally of the mount, and arranged whereby one end thereof is adapted to operatively engage the means in the camera for altering the output of the light sensitive cell when the mount is secured to the camera, while the other end thereof is adjacent the diaphragm operating ring and is provided with longitudinal slot, a key fixed to said diaphragm operating ring and extending into the slot in said connecting ring to operatively connect the two together, and a pin and slot connection between said sleeve and the mount for translating a rotative movement of the sleeve to an axial movement thereof, said pin and slot connection being of a form whereby when the sleeve is moved axially through rotation of the diaphragm operating ring the output of said light sensitive cell will be varied in accordance with the change in the diaphragm opening.

JOSEPH MIHALYI.